United States Patent
Takano (10) Patent No.: US 7,054,715 B2
(45) Date of Patent: May 30, 2006

(54) SYSTEM, METHOD, AND PROGRAM FOR ROBOT CONTROL

(75) Inventor: Yosuke Takano, Tokyo (JP)

(73) Assignee: NEC Corporation, Tokyo (JP)

( * ) Notice: Subject to any disclaimer, the term of this patent is extended or adjusted under 35 U.S.C. 154(b) by 118 days.

(21) Appl. No.: 10/410,190

(22) Filed: Apr. 10, 2003

(65) Prior Publication Data

US 2003/0195658 A1    Oct. 16, 2003

(30) Foreign Application Priority Data

Apr. 12, 2002    (JP)    ............................. 2002-111145

(51) Int. Cl.
*G06F 19/00*    (2006.01)

(52) U.S. Cl. ................. 700/245; 700/248; 700/249; 700/251; 700/257; 700/262; 700/263; 700/900; 318/568; 318/568.2; 318/568.23; 901/27; 901/30

(58) Field of Classification Search ............. 700/245, 700/263, 262, 257, 213, 248–249, 251, 900; 901/27, 30, 42, 15; 318/568, 568.2, 568.23, 318/568.11
See application file for complete search history.

(56) References Cited

U.S. PATENT DOCUMENTS

| 4,503,507 | A | * | 3/1985 | Takeda et al. | ............... 700/249 |
| 4,586,151 | A | * | 4/1986 | Buote | ......................... 700/249 |
| 4,891,765 | A | * | 1/1990 | Hatori et al. | ................ 700/249 |
| 4,896,087 | A | * | 1/1990 | Onaga et al. | ................ 700/249 |
| 5,268,837 | A |   | 12/1993 | Saylor | |
| 5,710,870 | A | * | 1/1998 | Ohm et al. | .................. 700/263 |
| 6,658,325 | B1 | * | 12/2003 | Zweig | ......................... 700/245 |
| 6,687,571 | B1 | * | 2/2004 | Byrne et al. | ................ 700/245 |
| 6,865,562 | B1 | * | 3/2005 | Fromherz et al. | ............. 706/14 |
| 6,889,118 | B1 | * | 5/2005 | Murray et al. | ............... 700/250 |

FOREIGN PATENT DOCUMENTS

| EP | 0 923 011 A3 | 6/1999 |
| JP | 2000-267852 A | 9/2000 |
| WO | WO 2004/088514 A1 | 10/2004 |

OTHER PUBLICATIONS

Agapakis et al., Programming & Control of multiple robotic devices in coordinated motion, 1990, IEEE, pp. 362-367.*

* cited by examiner

*Primary Examiner*—Thomas G. Black
*Assistant Examiner*—McDieiunel Marc
(74) *Attorney, Agent, or Firm*—Sughrue Mion, PLLC (57) ABSTRACT

System and method for allowing execution of control over robot hardware other than specific robot hardware by using control software that does not have features to be applied to the robot hardware other than the specific hardware designed for control. Control software makes an inquiry about the presence of robot function requested by control software through the use of interface recording and robot function searching. If it has been found that the robot function is present, there is a requests that robot motion be performed. If it has been found that the robot function is not present, the request is skipped, or the request is made to similar robot function.

31 Claims, 9 Drawing Sheets

SYSTEM, METHOD, AND PROGRAM FOR ROBOT CONTROL

FIELD OF THE INVENTION

The present invention relates to a robot control technique. More specifically, the invention relates to a system and a method for robot control that can be applied to different uses by replacement of control software, and a computer program product for executing robot control processing by a computer.

BACKGROUND OF THE INVENTION

Recently, robots that can realize different motions are widely used. In these robots, different motions can be realized by replacement of control software for controlling the robots. In an "AIBO" by Sony, which is a trademark of Sony, for example, different motions of the robot are enabled by equipping the robot with an external memory including an extension program. In a lot of robots at present, control software that fully matches hardware configurations of the robots is included. In the robot that has only arms and feet, for example, control software for controlling the motions of the arms and the feet is combined for use, and control software that controls the motions of the arms and a head is not employed for combination.

Various types of control software for the robot are made. In amusement-oriented robots such as so-called pet-type robots in particular, there are considerable needs for executing control software by using an arbitrary robot, even if the control software does not always match the hardware of the robot. By way of such an example, a case can be pointed out where, in order to get pleasure from motions of the arms alone, the control software for controlling the motions of the arms and the foot is executed by using a robot without foot.

A publication (JP Patent Kokai JP-P2000-267852A), for example, discloses a robot of which the shape can be altered by replacement of a part. In this robot, installed parts are detected, and for each shape obtained by part replacement, information on the result of part detection is held in information holding means. Then, based on the result of comparison between the result of part detection associated with a current shape and the information held in the information holding means, software is altered according to the shape. In an invention described in this publication, a configuration of the control software is altered so as to match the hardware configuration of the robot. The control software is so configured that software components for the arms, feet, and head are included to accommodate any one of the combinations of the arms and the feet, the arms and the head, and the foot and the arms. By reading the hardware configuration of the robot, software components thereof can be reconfigured and then assembled into a collection of required software components.

SUMMARY OF THE DISCLOSURE

In an approach described in the above-mentioned publication (JP Patent Kokai JP-P2000-267852A), variations of software components required for altering the configuration need to be included in the control software in advance, so that a problem arises that the manufacturing cost of the control software increases.

Further, the hardware range of the robot that can be handled is also limited. If control software that includes software components of the arms, feet, and head is made so as to accommodate any one of the combinations of the arms and the feet, arms and the head, and the feet and the arms, for example, the hardware of the robot that uses a combination of the arms and a tail, which is not predicted by the control software, cannot be handled.

Accordingly, it is an objective for the present invention to provide a system, a method, and a program for enabling execution of a control software even if a robot hardware that is not to be controlled by the control software is employed.

A system for providing means for solution of the problems described above according to an aspect of the present invention is a robot control system for controlling a robot of which motions can be varied by replacement of control software. The robot control system comprises:

execution means for executing the control software;

robot function means for realizing at least one of a set of one or more motions performed by the robot, upon request by the execution means;

interface recording means for storing and holding interface specifications between the robot function means and the control software; and robot function searching means for searching in the interface recording means for the robot function means having an interface specification requested by the control software executed by the execution means.

A program (a computer program product) according to other aspect of the present invention comprises a program for execution by a computer, the computer being capable of accessing interface recording means for storing and holding interface specifications between robot function means and control software, the computer performing control over processing for a robot in which robot function means is called for implementation, upon request by execution means for executing the control software, thereby performing an associated robot motion, wherein the program causes the computer to execute the steps of:

robot function search processing for searching in the interface recording means for the robot function means having interface specifications requested by the control software executed by the execution means; and processing for calling the searched robot function means for implementation.

A robot control method according to other aspect of the present invention is a robot control method of controlling a robot of which motions can be varied by replacement of control software, wherein interface specifications between the control software and robot function means for realizing a robot motion upon request by execution means for executing the control software are stored in an interface recording unit in advance; and the method comprises steps of:

searching the interface recording unit for the robot function means having interface specifications requested by the control software executed by the execution means; and calling the robot function means searched in the step of searching in response to a request by the control software, for implementation. As apparent from descriptions about embodiments to be described below, the problems described above can also be solved by solutions as set forth in claims in a similar manner.

The present invention comprises:

execution means for executing control software;

at least one robot function means for realizing a robot motion upon request by the execution means;

interface recording means for storing and holding interface specifications between each robot function means and the control software; and robot function searching means for searching the interface recording means for robot function means having interface specifications requested by the control software. The robot function searching means checks whether a robot function means requested by the control software is present in the robot or not. In response to a request by the control software, the robot function means searched by the robot function searching means is called to execute a robot motion.

Further, when the robot function means requested by the control software is not found, the robot function searching means according to the present invention has a function of allowing search for robot function means similar thereto. Thus, it offers an alternative possibility for the control software to use the similar robot function means.

Further, when the robot function means is not found on the robot, the interface recording means according to the present invention records information designating robot function means as an alternative to the robot function means, together with interface specifications of the robot function means. The alternative robot function means is thereby activated in response to a request by the control software.

According to the present invention, when the robot function means having interface specifications requested by the control software is not found, its implementation is skipped. Execution of the control software can be thereby continued.

For practicing the present invention, the control software does not need a special feature. According to the present invention, by a system provided by the robot, mismatching between the control software and robot function means included in the robot is solved.

According to the present invention, each of the means can be made to be used even if a part that is detachable from the robot, other computer connected to the robot via a network, or a recording medium that can be uninstalled from the robot are present.

According to the present invention, software control over the execution means, robot function searching means, and robot function means is implemented by a program run on the computer.

PREFERRED EMBODIMENTS OF THE INVENTION

Figure 1:
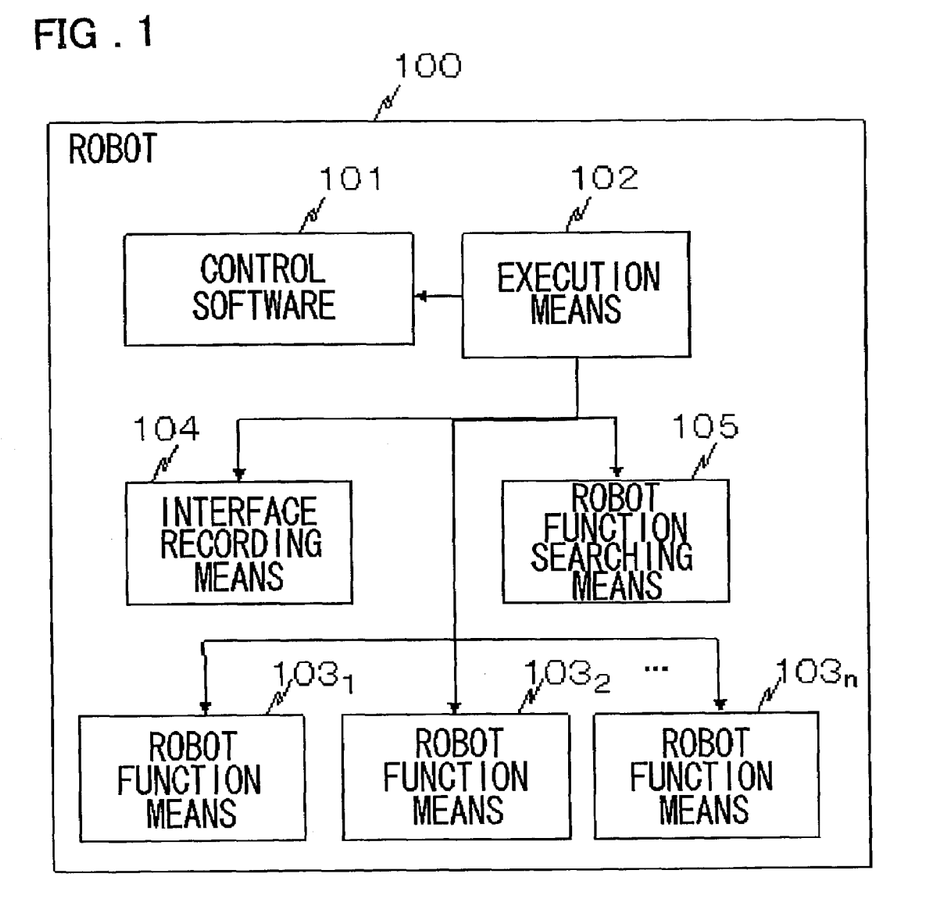
FIG. 1 is a block diagram showing a configuration of an embodiment of the present invention.

Next, embodiments of the present invention will be described in detail with reference to drawings. FIG. 1 is a block diagram showing a configuration of a first embodiment of the present invention.

Referring to FIG. 1, a robot 100 according to a first embodiment of the present invention comprises control software 101, execution means 102 for executing commands of the control software 101 one after another, a plurality of robot function means $103_1$ to $103_n$ for realizing respective motions of the robot 100, and interface recording means 104 for recording interface specifications of the robot function means $103_1$ to $103_n$, and robot function searching means 105 for determining robot function means that matches a request by the control software 101, using the interface recording means 104. The control software 101 is stored in storage means not shown, from which a command is read out, decoded, and executed by the execution means 102. The execution means 102 is included in a compile system where execution of codes obtained by compilation the commands of the control software 101 is performed. The commands of the control software 101 may also be of course implemented in an interpreter system where sequential interpretation and execution of the commands of the control software 101 is performed.

In the embodiment in FIG. 1, interface specifications of the robot functional means $103_1$ to $103_n$ are stored in a single interface recording means 104. However, in the present invention, in place of this configuration, it may also be so configured that the interface recording means 104, for example, records interface specifications associated with at least one specific robot function means 103, and a plurality of such interface recording means 104 are provided.

Figure 2:
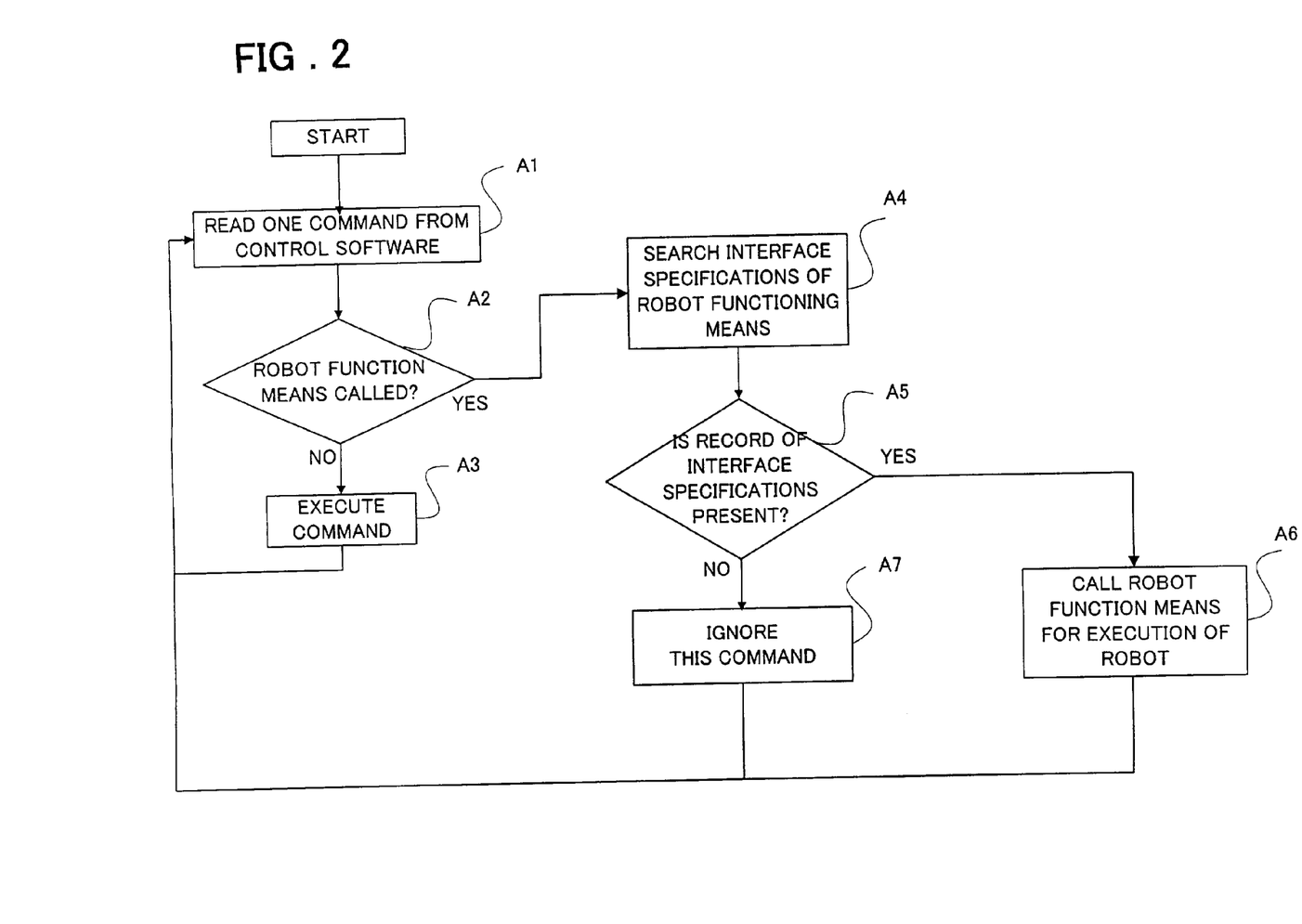
FIG. 2 is a flowchart showing a processing procedure according to a first embodiment of the present invention.

FIG. 2 is a flowchart for explaining processing operations according to the first embodiment of the present invention, and is the flowchart for explaining a processing procedure by the execution means 102 and the robot function searching means 105. The operations (or a robot control method) according to the first embodiment will be described with reference to FIGS. 1 and 2. The function of the processing procedure by the execution means 102 and the robot function searching means 105, shown in FIG. 2 is realized by a program run on a computer making up the robot 100, for example.

The execution means 102 reads one command from the control software 101 at step A1, decodes it, and determines whether the command calls the robot function means 103 or not, at step A2.

If it has been found as the result of determination by the execution means 102 that the command calls the robot function means 103, the operation shifts to step A4, which is a Yes branch of step A2.

If it has been found as a result of determination by the execution means 102 that the command does not call the robot function means 103 (No branch of step A2), the execution means 102 executes the command at step A3, and the operation then returns to step A1. Among commands of the control software 101, there may be included a command for stopping execution of the control software 101.

The command for calling the robot function means 103, which is included in the control software 101 takes a command format as follows, for example:

name of a functional part of the robot function means, name of the robot function means (argument, index or label).

Specifically, the command takes the following format, for example:

foot. advance (100)

This command is the command for calling the robot function means 103 identified by the name of "foot. advance" by adding an argument "100" thereto. The argument "100" is passed to the robot function means 103 named "foot. advance", and the "foot. advance" robot function means 103 makes an advance corresponding to the argument 100, such as 100 cm. Incidentally, the argument corresponds to a parameter (indication) passed to the robot function means 103 called. The argument is not limited to a single one, and a plurality of arguments may be used.

The above-mentioned command format of the control software 101 is set to be specific to the command for calling the robot function means. With this arrangement, determination of a condition at step A2 in FIG. 2 is performed by analyzing the format of a command.

The execution means 102 calls the robot function searching means 105 at step A4 if it has been found at step A2 in FIG. 2 that the command calls the robot function means 103, and informs the robot function searching means 105 of the name of the robot function means 103. The robot function searching means 105 performs the operation of searching whether interface specifications for the name supplied are recorded in the interface recording means 104 or not.

If it has been found as a result of search by the robot function searching means 105 that the interface specifications for the name supplied are recorded in the interface recording means 104 (If Yes at step A5), the interface specifications are obtained.

It is assumed that following interface specifications, for example, are recorded in the interface recording means 104. This description conforms to an XML1.0 specification (http://www.w3c.org/TR/2000/REC-xml-20001006/).

<functional part name="foot">
<robot function name="advance">
<argument name="distance" unit="cm">
</robot function>
<functional part>

Note, here, the functional part name may be further identified in case there are a plurality of functional parts of the same category, e.g. suffixed or indexed with identifiers such as R, L; numerical index. For "foot", e.g., "foot R", "foot L" or "foot 1", "foot 2". For simplifying the explanation, only "foot" is used here.

The name "foot. advance" is separated before and after a dot The name ("foot") before the dot "." is compared with a "name" attribute value of a functional part element. The name ("advance") after the dot "." is compared with a "name" attribute value of a robot functional element, which is a subelement of the functional part element. If a robot functional element with both of the values matching with the names is present, robot function means identified by the name "foot. advance" is searched for.

If it has been found as a result of search by the robot function searching means 105 that a record on the interface specifications for the name received from the execution means 102 is present in the interface recording means 104, or the requested robot function means is present in the robot 100 (If Yes at step A5), the execution means 102, upon reception of the result of the search by the robot function searching means 105, calls the robot function means 103. At this point, an argument is delivered, and the motion of the robot by the robot function means 103 is executed at step A6. Then, the operation returns to step A1.

If it has been found as a result of the search by the robot function searching means 105 that the record on the interface specifications for the name received from the execution means 102 is not present in the interface recording means 104, or the robot function means for the name is not present in the robot (If No at step A5), the execution means 102 ignores the command to call the robot function means at step A7, and the operation returns to step A1.

Incidentally, referring to FIG. 1, if it has been found as a result of the search through the interface recording means 104 by the robot function searching means 105 that has received a request (name information of the robot functional means) from the execution means 102 that the requested robot function means is present, the robot function searching means 105 returns the result of the search to the execution means 102, and the execution means 102 calls the searched robot function means 103 for implementation. Alternatively, it may be so arranged that, if it has been found that the requested robot function means is present in the robot 100 as a result of the search through the interface recording means 104 by the robot function searching means 105 that has received the request from the execution means 102, the robot function searching means 105 performs control for activating the searched robot function means 103. Then, it may be so arranged that the result of processing executed by the robot function means 103 (e.g. a code indicating normal completion or error notification) is returned to the execution means 102, which is the source of the request. The interface specifications recorded in the interface recording means 104 are described in conformity with an XML and are made to be suitable for searches. In the present invention, however, the format of the interface specifications is not limited to the XML, and may take any format and style.

Figure 3:
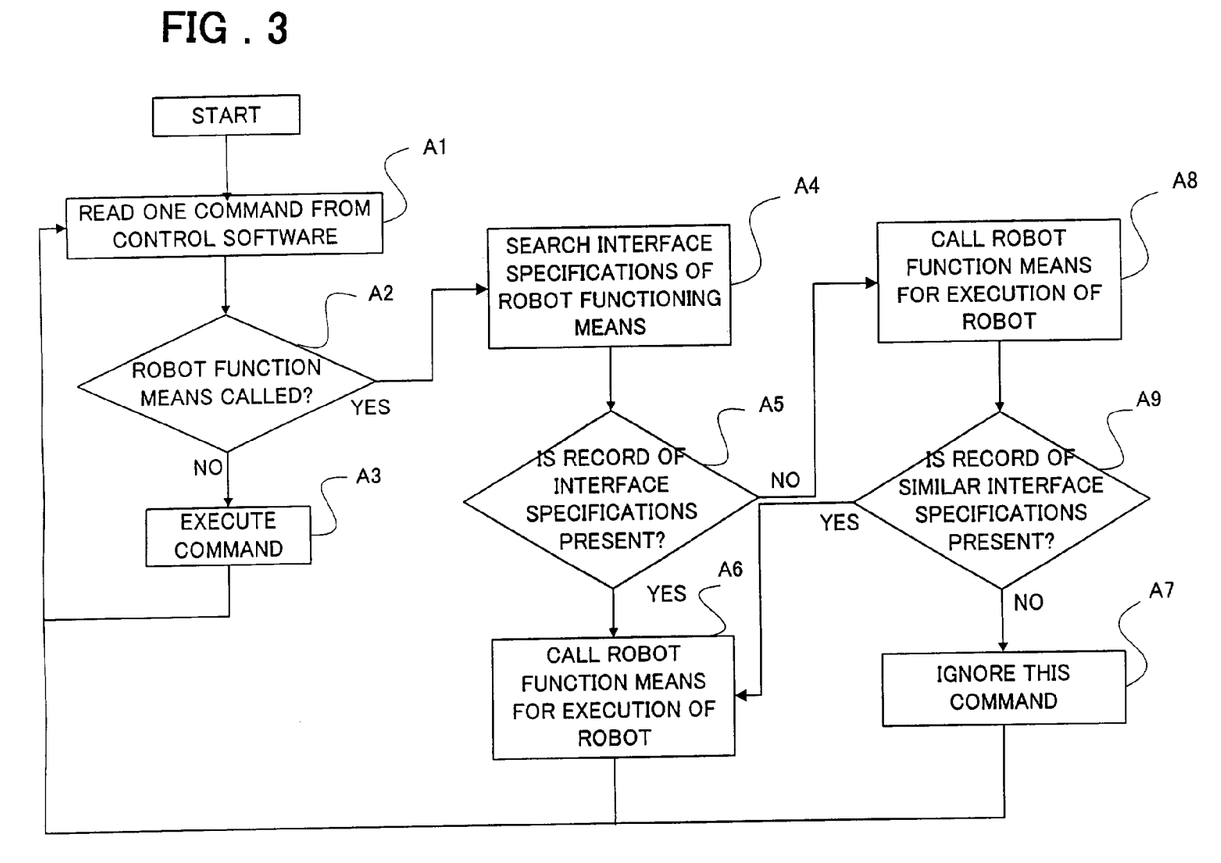
FIG. 3 is a flowchart showing a processing procedure according to a second embodiment of the present invention.

Next, a second embodiment of the present invention will be described. The configuration of the second embodiment of the present invention is assumed to be the same as the configuration shown in FIG. 1. FIG. 3 is a flowchart for explaining a processing procedure by the execution means 102 and the robot function searching means 105 according to a second embodiment of the present invention. The function of the processing procedure by the execution means 102 and the robot function searching means 105 shown in FIG. 3 is realized by a program run on a computer constituting the robot 100, for example. Referring to FIG. 3, like reference numerals are assigned to like steps in FIG. 2. That is, processing from steps A1 through A6 is the same as the processing in the first embodiment shown in FIG. 2. With reference to FIGS. 1 and 3, a difference in operations or a method of controlling the robot according to the second embodiment of the present invention from the operations or the method in the first embodiment will be described.

If it has been found as a result of search through the interface recording means 104 by the robot function searching means 105 that requested robot function means for a name supplied from the execution means 102 is present (If Yes at step A5 in FIG. 3), the execution means 102 calls the robot function means, and causes the robot function means to execute a motion of the robot at step A6. Then, the operation returns to step A1.

If it has been found as a result of search by the robot function searching means 105 that the requested robot function means for the name supplied from the execution means 102 is not present (No at step A5), the execution means 102 calls and then causes the robot function searching means 105 to search in the interface recording means 104 for the robot function means similar to a designated robot function means at step A8. If it has been found that the similar robot function means is present in the interface recording means 104, the execution means 102 acquires its interface specifications.

In this embodiment, determination whether the robot function means similar to the designated robot function means is similar or not is made as follows, for example.

Assume that the following command for implementation by the robot function means is described as in the first embodiment, and that the robot function means associated with the name could not be searched.

foot. advance (100)

The robot function searching means 105 searches in the interface recording means 104 to compare only the latter half of a name "foot. advance" or a name ("advance") after the dot "." with the "name" attribute value of a robot function element, which is a subelement of an arbitrary functioning part element. If the robot functioning element with these matching is present, it is determined the robot function means similar to the robot function means identified by the name "foot. advance" is present. If the following interface definitions (specifications) are present, for example, it is determined to be the robot function means similar to the one associated with the name "foot. advance".

<functional part name="moving function">
<robot function name="advance">
<argument name="distance" unit="cm"/>
</robot function>
</functional part>

If it has been found as a result of search by the robot function searching means 105 that a record on similar interface specifications is present in the interface recording means 104 (Yes at step A9), the execution means 102 receives the result of the search for the similar robot function means, and then calls the similar robot function means for execution of a robot motion of the similar robot function means at step A6. Then, the operation returns to step A1.

If it has been found as a result of search by the robot function searching means 105 that the similar robot function means is not present in the interface recording means 104 (No at step A9), the execution means 102 that has received the result ignores a command for calling the robot function means at step A7. Then, the operation returns to step A1.

Figure 4:
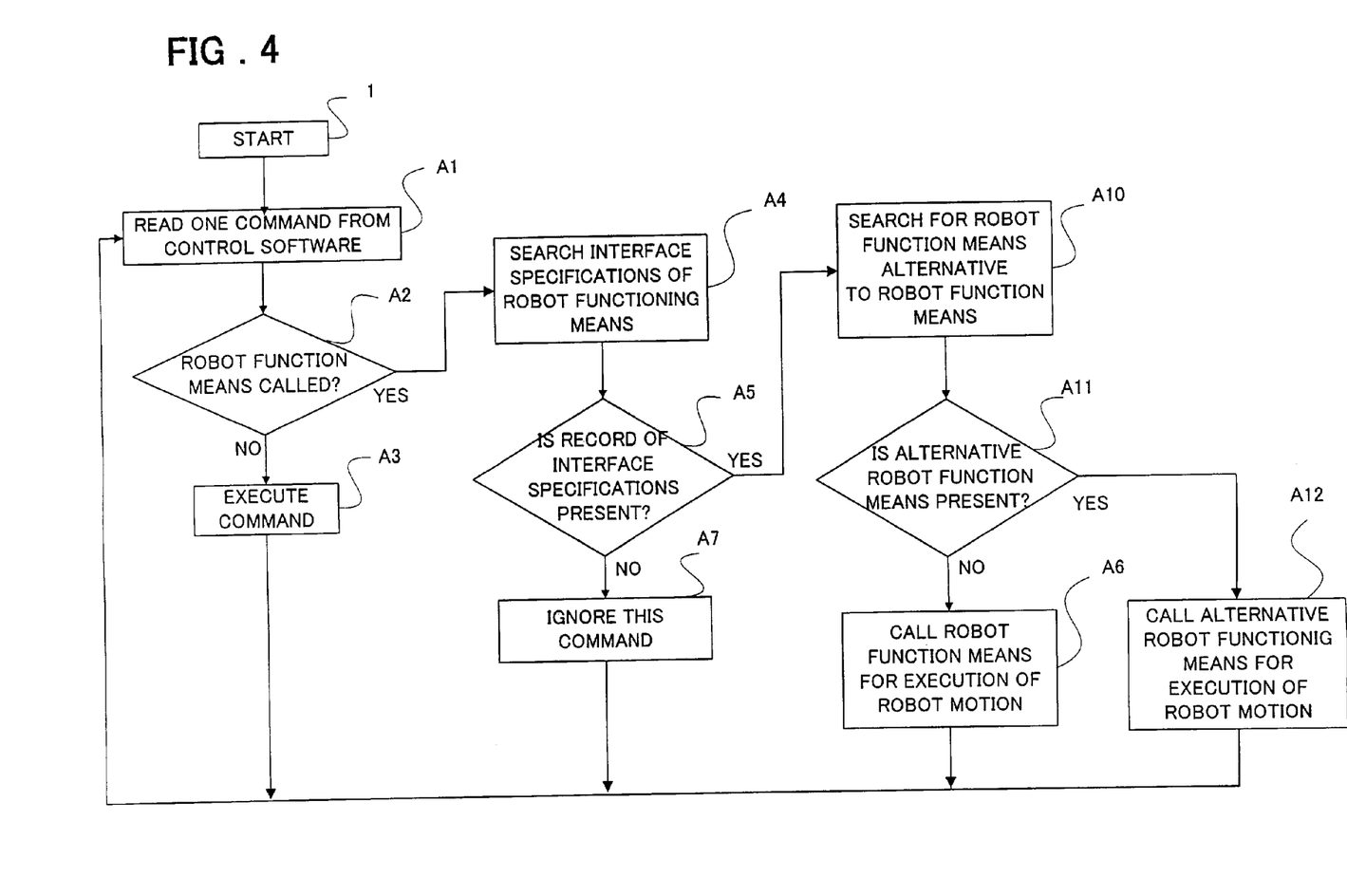
FIG. 4 is a flowchart showing a processing procedure according to a third embodiment of the present invention.

Next, a third embodiment of the present invention will be described. It is assumed that the configuration of the third embodiment is the same as the configuration shown in FIG. 1. FIG. 4 is a flowchart for explaining a processing procedure by the execution means 102 and the robot function searching means 105 in the third embodiment of the present invention. The function of the processing procedure by the execution means 102 and the robot function searching means 105 shown in FIG. 3 is realized by a program run on a computer constituting the robot 100, for example. Referring to FIG. 4, like reference numerals are assigned to like steps in FIG. 2. That is, steps A1 through A5 in FIG. 4 are identical to the processing in the first embodiment shown in FIG. 2. With reference to FIGS. 1 and 4, a difference in operations or a method of controlling the robot according to the third embodiment of the present invention from the operations or the method in the first embodiment will be described.

Referring to FIG. 4, if the robot function searching means 105 has searched in the interface recording means 104 for name information (the names of a robot functioning part and a robot function) of robot function means requested by the execution means 102 at step A4, and then if it has been found that the robot function means associated with the name information is present (If Yes at step A5), the execution means 102 calls the robot function searching means 105 and then causes the robot function searching means 105 to search whether designation of alternative robot means is present or not in the robot function means at step A10.

If it has been found that designation of the alternative robot function means is present in the interface recording means 104 (If Yes at step A11), the alternative robot function means is implemented at step A12. Then, the operation returns to step A1.

As an example of designation of the alternative robot function means in the interface recording means 104, the alternative attribute ("alternative=") of a robot functioning element in interface specifications recorded in the interface recording means 104 is specified as follows:

<functional part name="foot">
<robot function name="advance" alternative="mouth. speak (This function is not present)"/>
</functional part>

In this example, as an alternative to the robot function means associated with "foot. advance", "mouth. speak (This function is not present)" is specified in the form of the alternative attribute in the robot functioning element.

By adding an argument indicating that "This function is not present.", this designation calls different robot function means by the name "mouth. speak". As a result, when the control software 101 commands "foot. advance", through the robot function means 103 by the name "mouth. speak", which the robot 100 includes, or through a loudspeaker (the mouth of the robot) driven by an audio synthesizer, a digital-to-analog converter circuit, and a drive circuit, not shown, a speech that "This function is not present." is given. Incidentally, instead of outputting the speech that "This function is not present." specified as an alternative in the interface specifications, an imitating motion of the robot function means associated with the original interface specifications such as an imitation sound when advancing on foot (or feet) may also be specified to be outputted from the loudspeaker in the form of a synthetic sound. The robot lacks the robot function means by the name of "foot. advance", so that the robot 100 which actually cannot advance on foot notifies a user of imitating a motion of advancing on foot (mimicking). The motion of the alternative robot function means is arbitrarily set.

If the alternative robot function means is not specified in the robot functioning element in the form of the attribute (if the robot function means by the name of "foot. advance" is present), the robot function means of the robot functioning element (the robot function means by the name of "foot. advance" in this case) is called for execution of the motion of the robot at step A6. Then, the operation returns to step A1.

Referring to FIG. 4, if it has been found as a result of search at step A4 that a record on the interface specifications of the requested robot function means is not present in the interface recording means 104, and the robot function means is thus not present (If No at step A5), the execution means 102 ignores (skips) a command for calling the robot function means by the control software at step A7. Then, the operation returns to step A1.

In this manner, according to this embodiment, interface specifications that do not present in the robot are recorded in the interface recording means 104 in advance. Then, by recording interface specifications (a functional part, a robot function, and a required argument) of alternative robot function means in the interface specifications, specific robot function means is caused to implement a predetermined motion and function in place of robot function means that is not present.

Next, embodiments about configurations of interconnecting the control software, control and execution means, robot function searching means, interface recording means, and robot function means according to the present invention will be described. In the embodiments to be described below, control for activating robot function means searched for by the robot function means which has received a request from the execution means and then searched in the interface recording means, and control for activating similar robot function means or alternative robot function means when the requested robot function means has not been found as a result of the search are exercised in the same manner as in the first through third embodiments.

Figure 5:
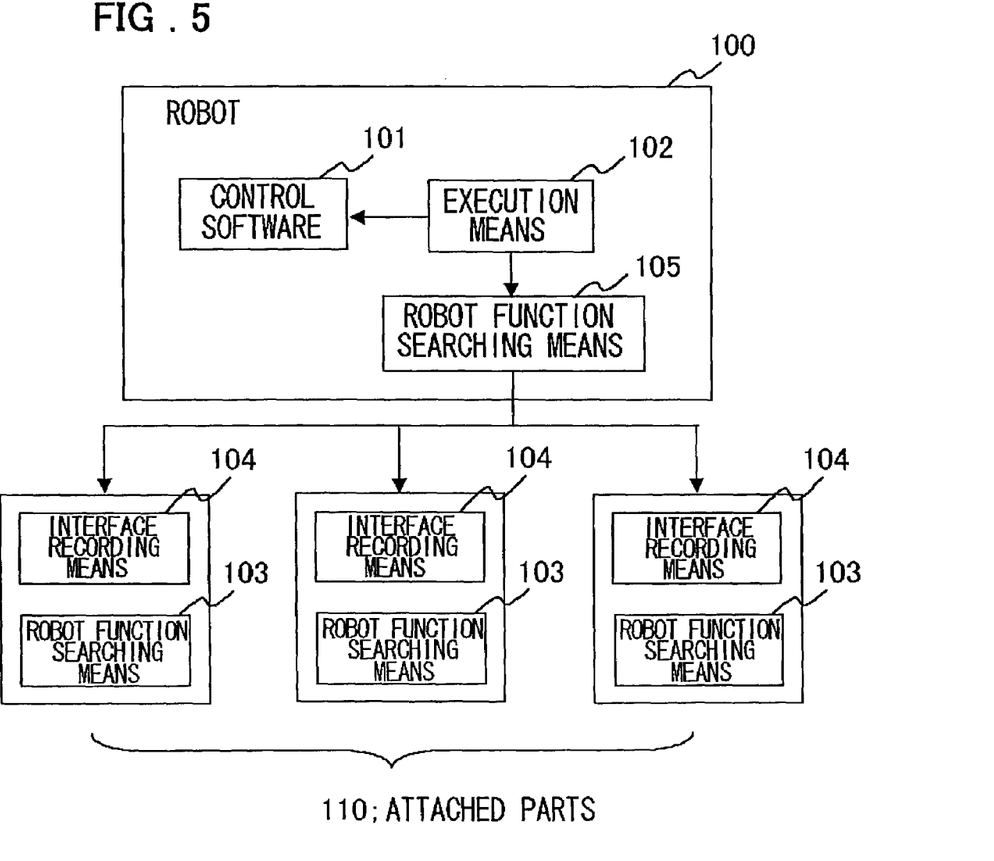
FIG. 5 is a block diagram showing a fourth embodiment of the present invention.

FIG. 5 is a block diagram showing a configuration of a fourth embodiment of the present invention. Referring to FIG. 5, in this embodiment, a main body of the robot 100 includes the control software 101, control and execution means 102, and robot function searching means 105, and includes a main body part of the robot 100 and a plurality of detachable attached parts 110. The attached parts 110 are constituted by arms, feet, and a tail, for example. Incidentally, the detachable attached parts 110 may be a single part. The attached parts 110 include the interface recording means 104, and the robot function means 103 for realizing robot motions of the attached parts 110 in their insides. The robot function searching means 105 searches for interface specifications recorded in the interface recording means 104 of an attached part 110, in response to a request from the execution means 102.

In this embodiment, the interface specifications of the robot function means recorded in the interface recording means 104 in each of the attached parts 110 may also be transferred to a memory in the main body, not shown, for storage, when the attached part 110 is attached to the main body or at power on, for example, and the robot function searching means 105 may also search in the memory not shown upon receipt of a request from the execution means 102.

Figure 6:
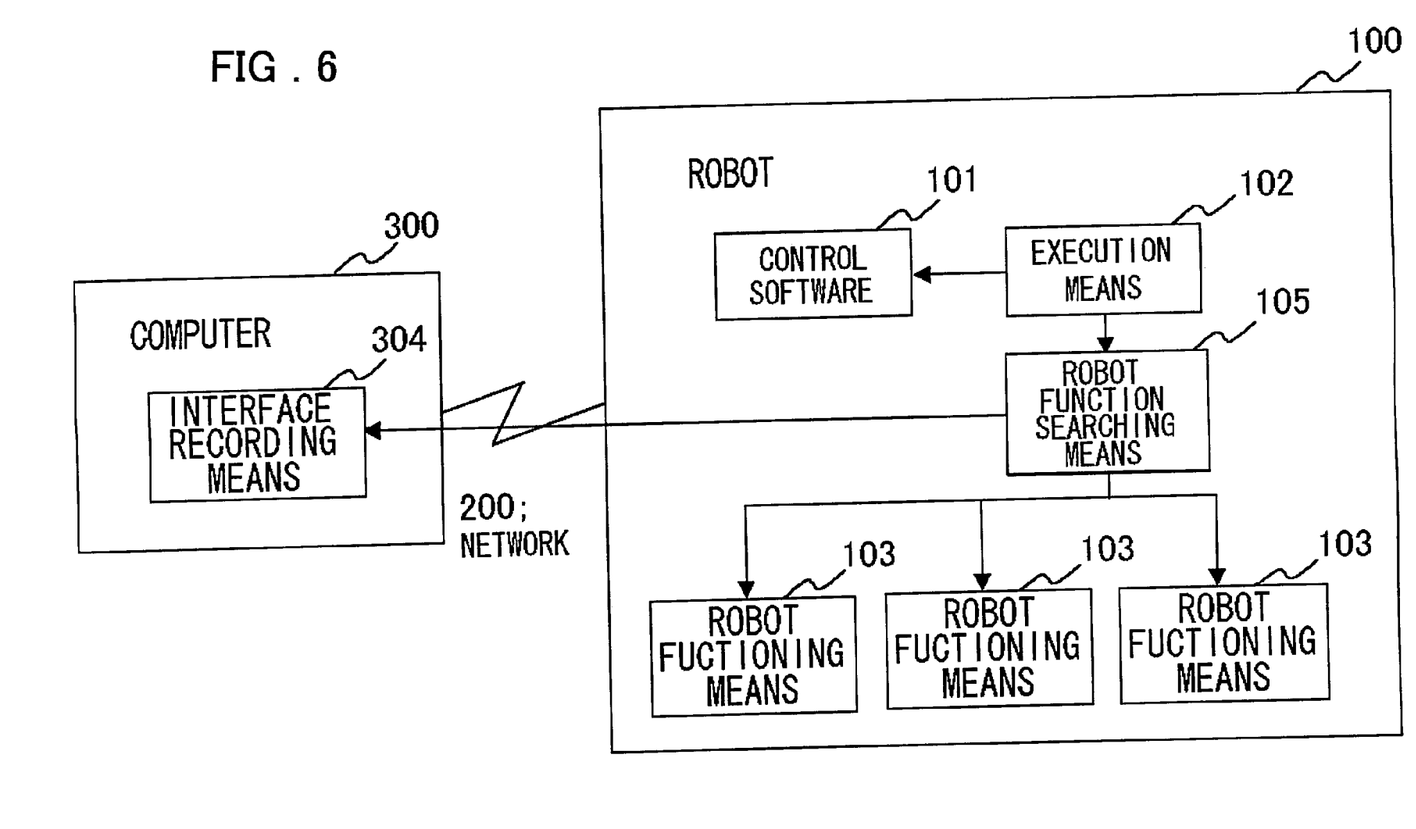
FIG. 6 is a block diagram showing a fifth embodiment of the present invention.

FIG. 6 is a block diagram showing a configuration of a fifth embodiment of the present invention. Referring to FIG. 6, the robot 100 in this embodiment includes the control software 101, execution means 102, robot function searching means 105, and robot function means 103. Interface recording means 304 is provided for a computer 300 connected to the robot 100 via a network 200. Interface specifications recorded in the interface recording means 304 are assumed to be the same as those described in the first through third embodiments. The computer 300 may be a personal computer, or a server. Preferably, the network 200 is constituted by a wireless network, and includes infrared data association (IrDA), Bluetooth for performing wireless communication between the personal computer and a cell phone, a wireless LAN, a mobile communication network, or an Internet, for example.

When receiving a search request (name information of robot function means) from the execution means 102, the robot function searching means 105 searches in the interface recording means 304 on the computer 300 via the network 200 through a communication control device not shown. The execution means 102, which has received the result of the search, calls the searched robot function means 103. If it has been found that the corresponding robot function means 103 is not present, skipping is performed, or control for activating similar robot function means 103 or alternative robot function means 103 is performed in the same manner as in the embodiments described before with reference to FIGS. 1 through 4. If the interface recording means 304 on the computer 300 is searched in this embodiment, the robot function searching means 105 may also give the names to be searched (names of the functional part and the robot function of the robot function means) to searching means on the computer 300, not shown, over the network 200. Then, the searching means on the computer 300 may search in the interface recording means 304, thereby obtaining a result of the search.

Figure 7:
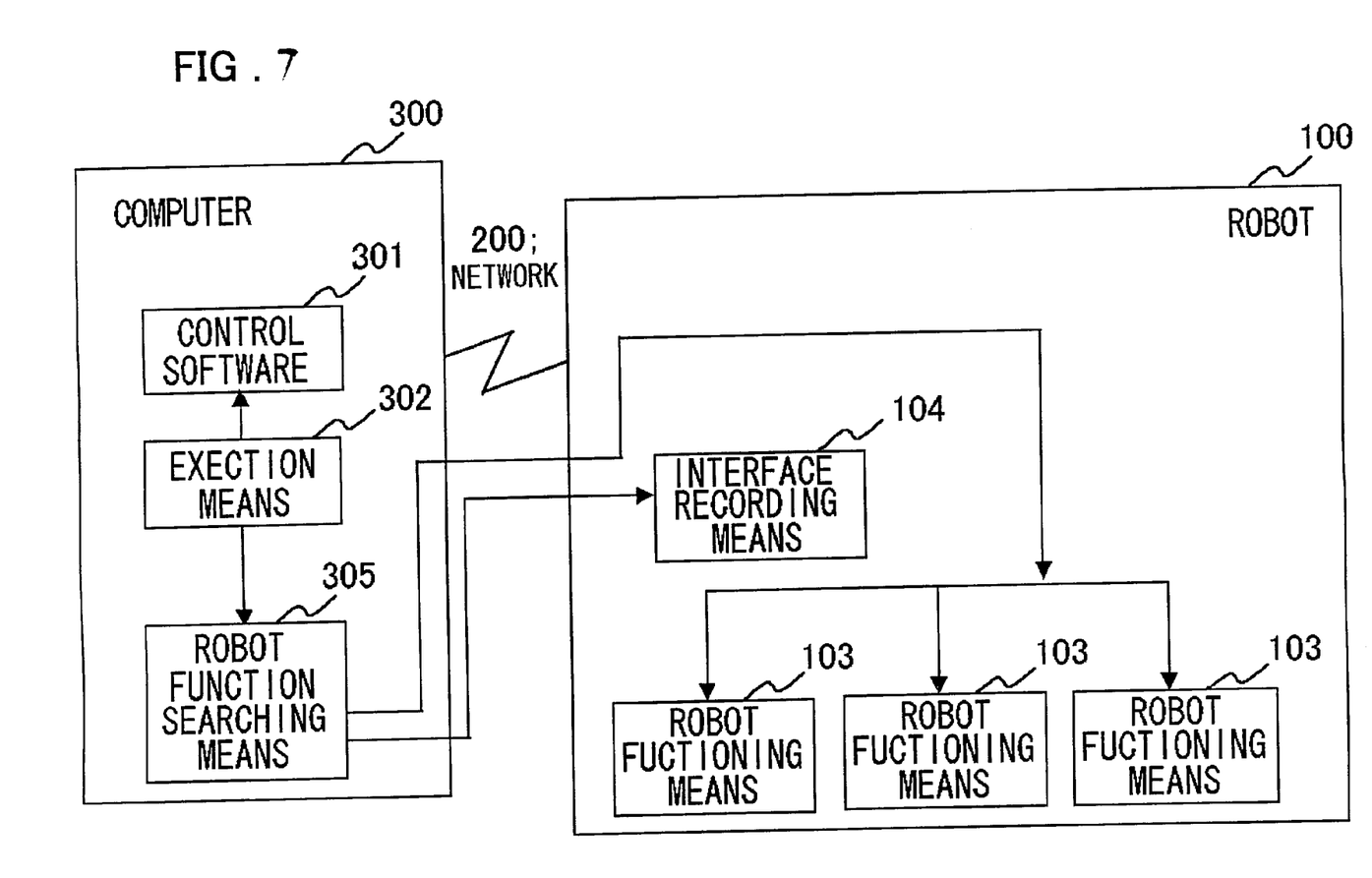
FIG. 7 is a block diagram showing a sixth embodiment of the present invention.

FIG. 7 is a block diagram showing a configuration of a sixth configuration of the present invention. Referring to FIG. 7, in this embodiment, the computer 300 connected to the robot 100 via the network 200 includes control software 301, execution means 302, and robot function searching means 305. The robot 100 includes the interface recording means 104 and the robot function means 103.

The computer 300 may be the personal computer, server, or the like. Preferably, the network 200 is constituted by the wireless network described before.

The robot function searching means 305 searches in the interface recording means 104 over the network 200 upon receipt of a request from the execution means 302 on the computer 300. The searched robot function means 103 is then called for execution of the motion of the robot. On the other hand, if it has been found as a result of the search by the robot function searching means 105 that the corresponding robot function means 103 is not present, the execution means 302 skips the request of the software 301, or control for activating similar robot function means 103 or alternative robot function means 103 is performed in the same manner as in the first through third embodiment described with reference to FIGS. 1 through 4.

Figure 8:
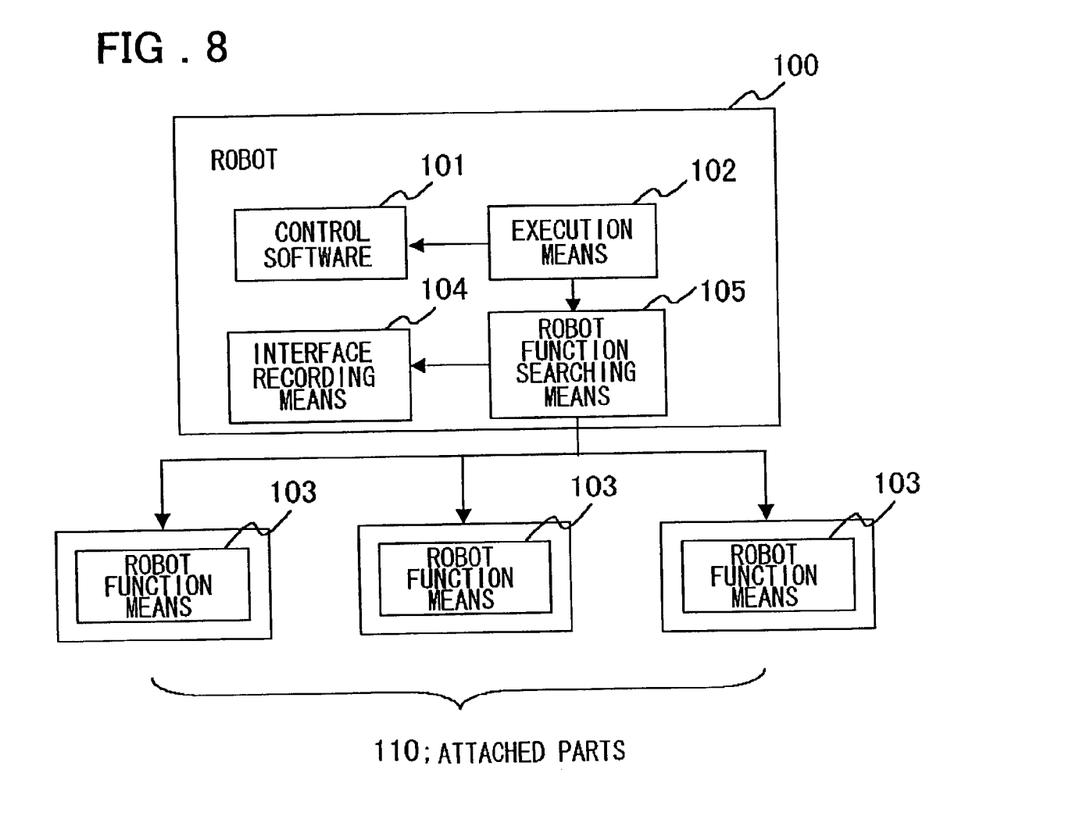
FIG. 8 is a block diagram showing a seventh embodiment of the present invention.

FIG. 8 is a block diagram showing a configuration of a seventh embodiment of the present invention. Referring to FIG. 8, in this embodiment, the main body of the robot 100 includes the control software 101, execution means 102, interface recording means 104, and robot function searching means 105, and includes the main body part of the robot 100 and a plurality of detachable attached parts 110. Each of the attached parts 110 includes robot function means 103. When an attached part 110 is attached to the main body of the robot, or at power-on, information on interface specifications of the robot function means 103 of the attached part 110 is registered in the interface recording means 104. When the attached part 110 is detached from the main body of the robot, control is exercised so that the information on the interface specifications stored in the interface recording means 104 is deleted from the interface recording means 104 or information indicating deletion (flag information) is added. The detachable attached parts 110 may be a single one.

Figure 9:
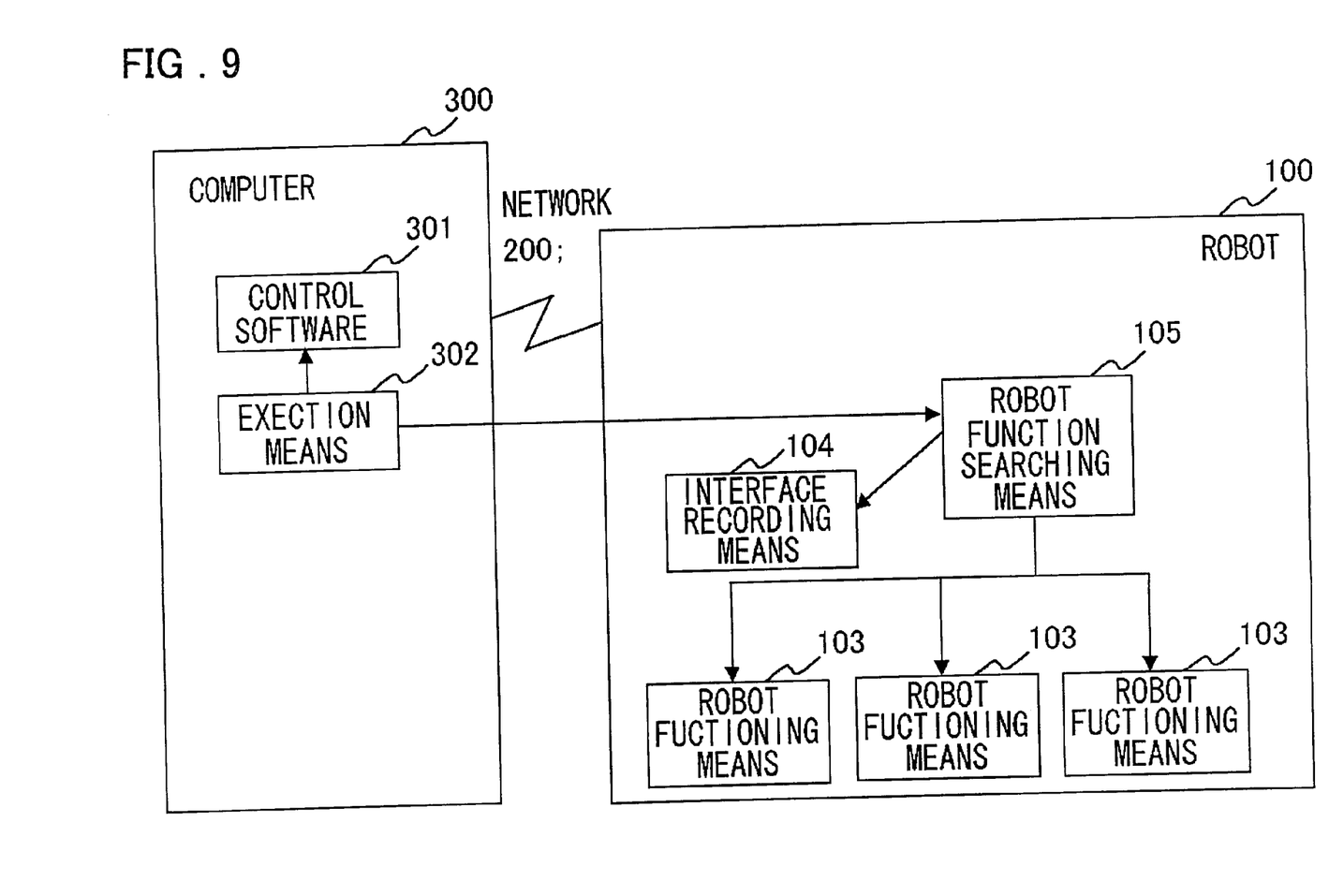
FIG. 9 is a block diagram showing an eighth embodiment of the present invention.

FIG. 9 is a block diagram showing a configuration of a ninth embodiment of the present invention. Referring to FIG. 9, in this embodiment, the computer 300 connected to the robot 100 via a network 200 includes the control software 301 and the execution means 302, and the robot 100 includes the robot function searching means 105, interface recording means 104, and robot function means 103.

The execution means 302 on the computer 300 activates the robot function searching means 105 on the robot 100 over the network 200 and causes the robot function searching means 105 to search the interface recording means 104. When robot function means 103 has been searched for by the robot function searching means 105, the searched robot function means 103 is called. On the other hand, if it has been found as a result of the search by the robot function searching means 105 that the corresponding robot function means 103 is not present, skipping is performed, or control for activating similar robot function means 103 or alternative robot function means 103 is performed in the same manner as in the embodiments described before with reference to FIGS. 1 through 4.

In this manner, the control software and the execution means may be provided for a computer, demonstrated with the robot 100 via the network or the like, being separate from the interface recording means and the robot function searching means. Replacement of the control software may be performed by replacement of a recording medium (detachable medium) that has recorded the control software. The control software may also be downloaded in the robot from other computer over the network. Alternatively, the control software may also be downloaded to the computer connected to the robot via the network from other computer.

Foregoing descriptions about the present invention were given in conjunction with the embodiments described above. The present invention, however, is not limited to the embodiments described above, and naturally includes various variations and modifications that could be made by those skilled in the art within the scope of the claims of the present invention.

The meritorious effects of the present invention are summarized as follows.

As described above, according to the present invention, by using the control software that does not have features to be applied to robot hardware other than specific robot hardware designed for control, control over the robot hardware other than the specific robot hardware is enabled.

The reason for this is as follows: in the present invention, an inquiry about the presence of robot function means requested by the control software is made. If the robot function means requested by a control software is not present, the request is skipped. Alternatively, if the robot function means requested by the control software is not present, robot function means similar to the requested robot function means is searched for. Still alternatively, robot function means alternative to the requested robot function means is searched for.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A robot control system for controlling a robot of which motions can be varied by replacement of control software, the robot control system comprising:
   execution means for executing said control software;
   robot function means for realizing at least one of a set of one or more motions performed by said robot, upon request by said execution means;
   interface recording means for storing and holding interface specifications between said robot function means and said control software; and
   robot function searching means for searching in said interface recording means for the robot function means having an interface specification requested by the control software executed by said execution means.

2. The robot control system according to claim 1, wherein said robot function searching means comprises:
   means for searching in said interface recording means for robot function means partly matching the interface specifications requested by the control software and outputting similar robot function means, that partly match the interface specifications, as a result of search when said robot function searching means cannot detect in said interface recording means the robot function means matching the interface specification requested by the control software executed by said execution means; and
   the similar robot function means searched for by said robot function searching means is called in response to the request by the control software, and a robot motion by the similar robot function means is executed.

3. The robot control system according to claim 2, wherein said execution means comprises means for exercising control so that the request by the control software is ignored and the robot function means is not implemented when the robot function means having the interface specification requested by the control software is not found and the similar robot function means is not found as the result of the search through said interface recording means by said robot function searching means.

4. The robot control system according to claim 2, wherein the interface specifications associated with the robot function means in said interface recording means include robot functional part and robot function as name information and have a region for storing arguments supplied from said execution means, for a parameter-requiring motion; and
   said robot function searching means comprises means for outputting as a result of the search robot function means having interface specifications including name information partly matching the name information of the robot function means specified by a command of the control software as the similar robot function means having similar interface specifications, when said robot function searching means has received from said execution means the name information of the robot function means specified by the command of the control software and cannot detect interface specifications including name information matching the name information of the robot function means, but when the interface specifications including the name information partly matching the name information of the robot function means specified by the command of the control software are present in said interface recording means.

5. The robot control system according to claim 1, wherein said interface recording means comprises a region for recording information associated with said interface specifications of said robot function means and designating robot function means alternative to said robot function means;
   said robot function searching means comprises means for outputting alternative robot function means as a result of search when designation of the robot function means alternative to the robot function means requested by a control software executed by said execution means is recorded as a result of the search through said interface recording means by said robot function searching means; and
   the alternative robot function means searched for by said robot function searching means is called in response to the request by the control software, and a robot motion by the alternative robot function means is executed.

6. The robot control system according to claim 5, wherein said execution means comprises means for exercising control so that the request by the control software is ignored and the robot function means is not implemented when the robot function means having the interface specification requested by the control software is not found and the alternative robot function means is not found as the result of the search through said interface recording means by said robot function searching means.

7. The robot control system according to claim 6, wherein said execution means comprises means for exercising control so that the robot function means is called for implementation when an interface specification of the robot function means is present in said interface recording means and the information associated with the interface specifications and designating the robot function means alternative to the robot function means is not recorded in said interface recording means as the result of the search through said interface recording means by said robot function searching means.

8. The robot control system according to claim 5, wherein the interface specifications associated with the robot function means in said interface recording means include robot functional part and robot function as name information, and have a region for storing arguments supplied from said execution means for a parameter-requiring motion;

an entry for the robot function in the interface specifications have an entry for specifying interface specifications of the alternative robot function means, in addition to a name of the robot function when robot function means associated with the robot functional part is not present; and said robot function searching means comprises means for outputting designated alternative robot function means as a result of search when said robot function searching means has received from said execution means the name information of the robot function means specified by a command of the control software and detects in said interface recording means interface specifications having a functional part matching a name of the robot functional part of the name information of the robot function means, and when the alternative robot functional means is designated in the interface specifications.

9. The robot control system according to claim 1, wherein said execution means comprises means for exercising control so that the request by the control software is ignored and the robot function means is not implemented when the robot function means having the interface specification requested by the control software is not found as a result of a search through said interface recording means by said robot function searching means.

10. The robot control system according to claim 1, wherein said robot comprises a main body part and one or more detachable attached parts of said robot;

at least one of said attached parts comprises said robot function means for realizing said motion of said robot, performed by the attached part, and interface recording means for recording interface specifications associated with said robot function means; and said robot function means in said attached part is called through a result of the search through said interface recording means by said robot function searching means that has received a request from said execution means.

11. The robot control system according to claim 1, wherein said interface recording means is disposed in a computer connected to said robot via a network; and said robot function searching means comprises means for searching said interface recording means over said network.

12. The robot control system according to claim 1, wherein said control software, said execution means, and said robot function searching means are disposed on a computer connected to said robot via a network;

said robot has said interface recording means;

said robot function searching means on said computer searches said interface recording means over said network; and said robot function means is called over said network, in response to a request from said execution means on said computer.

13. The robot control system according to claim 1, wherein said robot comprises a main body part and one or more detachable attached parts of said robot;

at least one of said attached parts comprises said robot function means for realizing said motion of said robot, performed by said attached part; and said robot function means is called through a result of the search through said interface recording means by said robot function searching means that has received a request from said execution means.

14. The robot control system according to claim 1, wherein said control software and said execution means are disposed on a computer connected to said robot via a network;

said robot has said robot function searching means;

said robot function searching means that has received a request from said execution means over said network searches in said interface recording means for robot function means; and the robot function means is called over said network, in response to the request from said execution means.

15. The robot control system according claim 1, wherein the interface specifications associated with the robot function means in said interface recording means include a robot functional part and a robot function as name information; and the interface specifications have a region for storing an argument passed from said execution means to the robot function means, for a parameter-requiring motion.

16. A program for execution by a computer, the computer being capable of accessing interface recording means for storing and holding interface specifications between robot function means and control software, said computer performing control over processing for a robot in which the robot function means is called for implementation, upon request by execution means for executing said control software, thereby performing an associated robot motion, wherein the program comprising, for causing said computer to execute, the steps:

robot function search processing for searching in said interface recording means for the robot function means having interface specifications requested by the control software executed by said execution means; and processing for calling the searched robot function means for implementation.

17. The program according to claim 16, wherein when robot function means matching the interface specifications requested by the control software is not found as a result of search through said interface recording means during said robot function search processing, the program comprises, for causing said computer to execute, processing for searching in said interface recording means for robot function means having interface specifications partly matching the interface specifications requested by the control software.

18. The program according to claim 16, wherein when designation of robot function means alternative to the robot function means is added to the interface specifications of the robot function means requested by the control software as a result of the search through said interface recording means during said robot function search processing, the program comprises, for causing said computer to execute, processing for outputting the alternative robot function means as the result of the search.

19. The program according to claim 16, wherein when the robot function means having the interface specifications requested by the control software is not found as a result of search through said interface recording means during said robot function search processing, the program comprises for causing said computer to execute, processing for exercising control so that said execution means ignores the request by the control software and does not implement the robot function means.

20. A robot control method of controlling a robot of which motions can be varied by replacement of control software, wherein interface specifications between said control software and robot function means for realizing a robot motion upon request by execution means for executing said control software are stored in an interface recording unit in advance; and the method comprises steps of:
  searching said interface recording unit for the robot function means having interface specifications requested by the control software executed by said execution means; and
  calling the robot function means searched in said step of searching in response to the request by the control software, for implementation.

21. The robot control method according to claim 20, further comprising a step of:
  searching in said interface recording unit for robot function means having interface specifications partly matching the interface specifications requested by the control software when the robot function means having the interface specifications requested by the control software is not found in said interface recording unit as a result of the search for the robot function means.

22. The robot control method according to claim 20, further comprising a step of:
  outputting alternative robot function means as a result of the search when designation of the robot function means alternative to the robot function means is recorded in the interface specifications of the robot function means requested by the control software, in said interface recording unit, as the result of the search for the robot function means.

23. The robot control method according to claim 20, wherein when the robot function means having the interface specifications requested by the control software is not found, said execution means exercises control so that the robot function means is not implemented.

24. The robot control method according to claim 20, wherein the interface specifications recorded in said interface recording unit include robot functional part and robot function as name information associated with the robot function means and have a region for storing argument information on the robot function means for a parameter-requiring motion.

25. The robot control method according to claim 20, wherein the interface specifications associated with the robot function means in said interface recording unit include robot functioning part and robot function as name information and have a region for storing an argument supplied from said execution means, for a parameter-requiring motion; and
  the method further comprises a step of:
  outputting as a result of the search robot function means having interface specifications including name information partly matching the name information of the robot function means specified by a command of the control software as similar robot function means having similar interface specifications when interface specifications including name information matching the name information of the robot function means specified by the command of the control software cannot be detected in said interface recording unit, but when the interface specifications including the name information partly matching the name information of the robot function means specified by the command of the control software are present in said interface recording means as the result of the search for the robot function means.

26. The robot control method according to claim 20, wherein the interface specifications of the robot function means in said interface recording unit include a robot functional part and robot function as name information, and have a region for storing an argument passed from said execution means, for a parameter-requiring motion;
  an entry for the robot function in the interface specifications has an entry for specifying interface specifications of alternative robot function means in addition to a name of the robot function when the robot function means associated with the robot functional part is not present; and
  the method further comprises a step of:
  outputting designated alternative robot function means as a result of the search when interface specifications having a functional part matching a name of the robot functional part of the name information of the robot function means specified by a command of the control software are detected in said interface recording unit, and when the alternative robot functional means is designated in the interface specifications as the result of the search for the robot function means.

27. A robot system comprising:
  execution means for executing control software for controlling motions of a robot;
  at least one robot function means for realizing a functional motion of said robot;
  interface recording means for storing and holding interface specifications, said interface specifications being information defining interface specifications between said robot function means and said execution means and including entries for name information of robot functional part and robot function and an entry for storing one or more items of argument information supplied from said execution means when said functional motion requires a parameter; and
  robot function searching means for receiving from said execution means the name information of the robot functional part and the robot function of robot function means and searching said interface recording means for checking whether information on interface specifications including the robot functional part is recorded therein and returning a result of search when said execution means for executing said control software has executed a command of the control software specifying the name information of the robot functional part and the robot function and the required argument information on the robot function means and then the robot function means has been called;
  wherein when interface specifications having name information matching the name information of the robot function means specified by the command are present in said interface recording means as a result of search by said robot function searching means, said execution means, upon receipt of the result of the search from said robot function searching means, calls the searched robot function means, so that a robot motion associated with the robot function means is executed;

when the interface specifications having the name information matching the name information of the robot function means specified by the command are not present in said interface recording means, said execution means skips the request of said control software; or when said robot function searching means has searched in said interface recording means for robot function means having interface specifications partly matching the name information of the robot function means specified by the command, said robot function searching means outputs similar robot function means, that partly match the name information, as the result of the search; and the similar robot function means searched by said robot function searching means is activated to execute a robot motion in response to the command of the control software.

28. The robot system according to claim 27, wherein said robot comprises a main body part and one or more detachable attached parts of said robot; and at least one of said attached parts comprises said robot function means called through the result of the search through said interface recording means by said robot function searching means that has received a request from said execution means, for realizing said motion of said robot, performed by said attached part.

29. The robot system according to any one of claims 27, wherein said control software is replaceable through a recording medium storing said control software or transmission through a communication medium from other device; and said motions of said robot can be varied by replacement of said control software.

30. A robot system comprising:

execution means for executing control software for controlling motions of a robot;

at least one robot function means for realizing a functional motion of said robot;

interface recording means for storing and holding interface specifications, said interface specifications being information defining interface specifications between said robot function means and said execution means and including entries for name information of robot functional part and robot function and an entry for storing one or more items of argument information passed from said execution means when said functional motion requires a parameter, said entry for said robot function allowing interface specifications of robot function means alternative to said robot function means to be defined; and robot function searching means for receiving from said execution means the name information of the robot functional part and the robot function of robot function means and searching said interface recording means for checking whether interface specifications including the robot functional part are recorded therein and returning a result of search when said execution means for executing said control software has executed a command of the control software specifying the name information of the robot functional part and the robot function and the required argument information on the robot function means, and then the robot function means has been called;

wherein when interface specifications including name information matching the name information of the robot function means specified by the command are present in said interface recording means as the result of the search by said robot function searching means and when said robot function searching means has detected designation of interface specifications of alternative robot function means in the interface specification including the name information matching the name information of the robot function means specified by the command, said robot function searching means outputs the alternative robot function means as the result of the search, and the alternative robot function means searched by said robot function searching means is activated to execute a robot motion.

31. The robot system according to claim 30, wherein said robot comprises a main body part and one or more detachable attached parts of said robot; and at least one of said attached parts comprises said robot function means called through the result of the search through said interface recording means by said robot function searching means that has received a request from said execution means, for realizing said motion of said robot, performed by said attached part.

* * * * *